United States Patent [19]
Guichard et al.

[11] Patent Number: 6,073,601
[45] Date of Patent: Jun. 13, 2000

[54] INTERNAL COMBUSTION ENGINE AIR INTAKE MANIFOLD WITH A RETRACTABLE ELEMENT HAVING AN ACOUSTIC BORE

[75] Inventors: Alain Guichard, Neuilly sur Marne; Michaël Pontoppidan, Rueil Malmaison, both of France

[73] Assignee: Magneti Marelli France, Nanterre, France

[21] Appl. No.: 09/147,040

[22] PCT Filed: Mar. 14, 1997

[86] PCT No.: PCT/FR97/00467

§ 371 Date: Sep. 17, 1998

§ 102(e) Date: Sep. 17, 1998

[87] PCT Pub. No.: WO97/35103

PCT Pub. Date: Sep. 27, 1997

[30] Foreign Application Priority Data

Mar. 19, 1996 [FR] France .................................. 96 03399

[51] Int. Cl.[7] .................................................. F02M 35/10
[52] U.S. Cl. ........................................................ 123/184.55
[58] Field of Search .................... 184/0.53, 0.55

[56] References Cited

U.S. PATENT DOCUMENTS

| 4,735,177 | 4/1988 | Koike ..................................... 123/52 M |
| 4,854,270 | 8/1989 | Melde-Tuczai et al. ............ 123/52 M |
| 4,862,840 | 9/1989 | Matsunaga et al. .................. 123/52 M |
| 4,932,369 | 6/1990 | Parr ..................................... 123/52 MB |
| 5,033,417 | 7/1991 | Van Basshuysen et al. ....... 123/52 MB |
| 5,813,380 | 9/1998 | Takahashi et al. .................. 123/184.55 |

FOREIGN PATENT DOCUMENTS

| 0 355 960 | 2/1990 | European Pat. Off. . |
| 2 577 646 | 8/1986 | France . |
| 2 724 418 | 3/1996 | France . |
| 43 17 563 | 12/1993 | Germany . |

Primary Examiner—Willis R. Wolfe
Assistant Examiner—Katrina B. Harris
Attorney, Agent, or Firm—Wenderson & Sturm LLP

[57] ABSTRACT

A manifold with air ducts that each include a downstream tube and two upstream tubes of which one is short and the other long, and a pivotable member with an acoustic through-bore between the upstream tubes and the downstream tube. When the member is in one of its end positions, one of the upstream tubes communicates with the downstream tube while the other upstream tube is sealed, and when it is in the other end position, the other upstream tube communicates with the downstream tube while the first upstream tube is sealed. The member is retractable and mounted in a housing and has two contactless-sliding side surfaces extending perpendicularly to the pivot axis of the member and frictionally engaging a respective one of the two side surfaces of the housing as the member is pivoted, whereby a laminar effect is generated which ensures good lateral sealing between the member and the housing. The manifold may be used in internal combustion injection engines, particularly for motor vehicles.

15 Claims, 2 Drawing Sheets

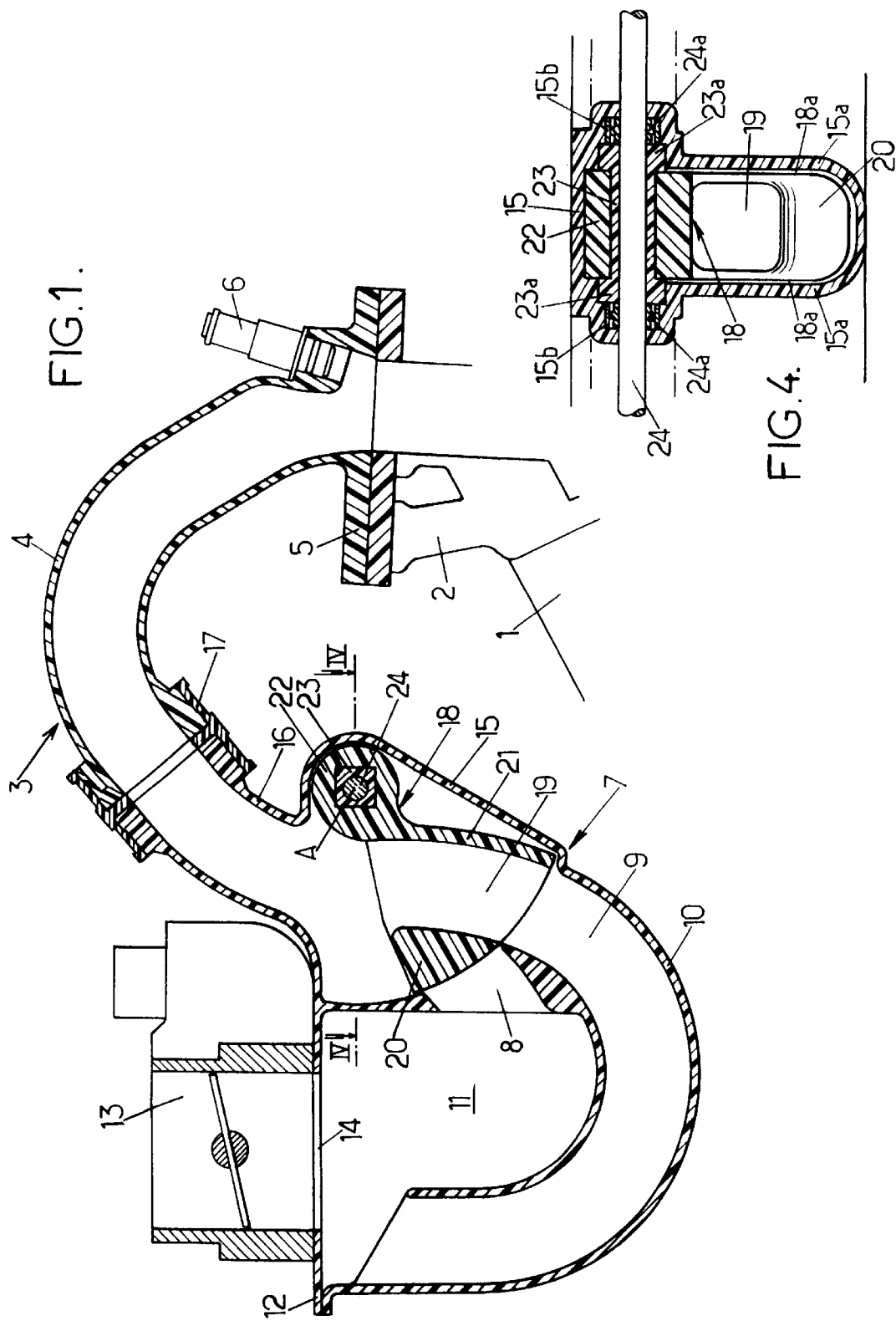

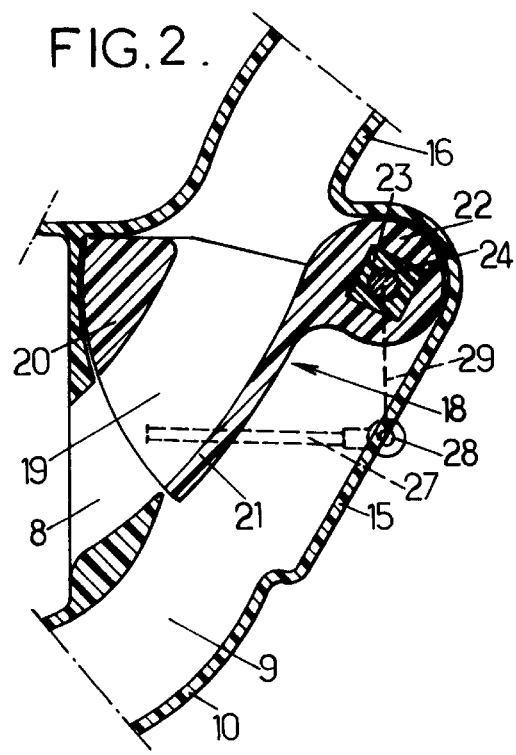
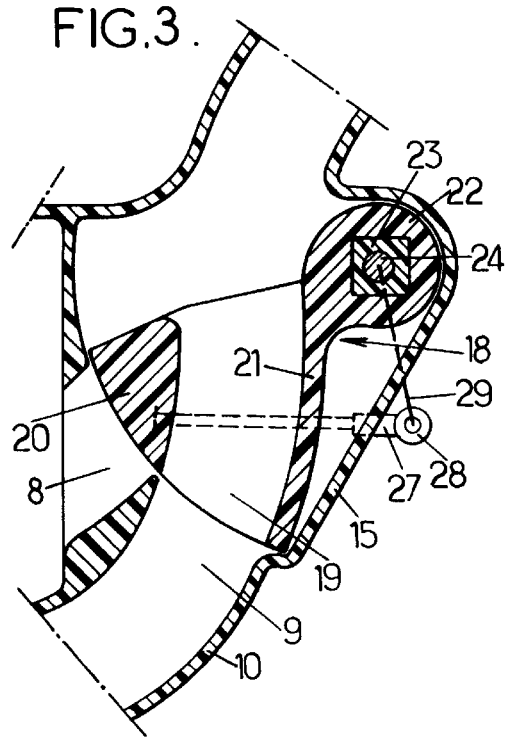
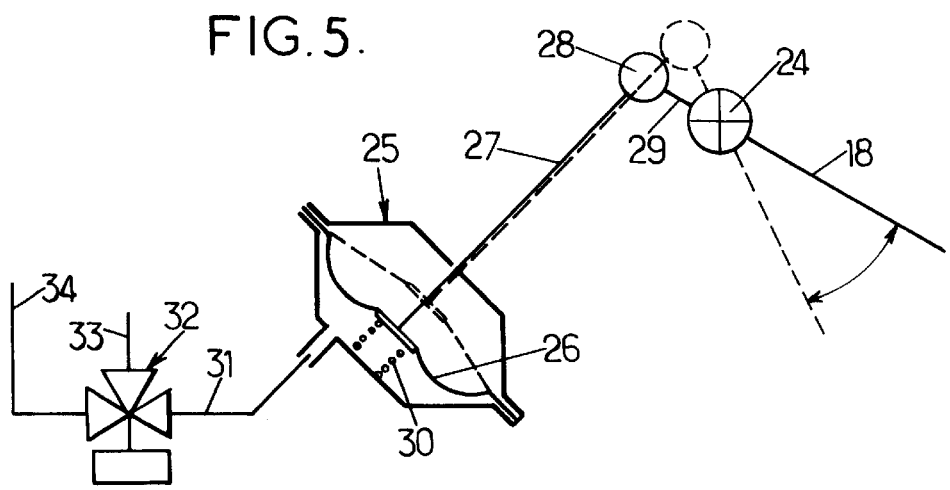

INTERNAL COMBUSTION ENGINE AIR INTAKE MANIFOLD WITH A RETRACTABLE ELEMENT HAVING AN ACOUSTIC BORE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to air intake manifolds for fuel-injected internal combustion engines, particularly for motor vehicles.

The invention relates more specifically to an intake manifold of this kind, of the type comprising, for each combustion chamber of the engine, an air duct, a downstream part of which comprises a single length of tube connected to at least one flange for attaching to the cylinder head of the engine, and an upstream part of which comprises two lengths of tube, namely a short upstream length and a long upstream length, each of which is fed with air via its upstream inlet from means of controlling the flow rate of inlet air, such as a throttle body, the downstream outlet of each length of upstream tube being intended to be placed in communication with the upstream inlet of the single length of downstream tube.

2. Description of the Prior Art

For noise-emission reasons, and for each air duct, it is known practice for the injector holder, which is made in the form of a small-size and lightweight element in an intake manifold, to be connected to the other elements of this manifold by a flexible sleeve, fixed to the engine block by at least one vibration damper, generally of the type known as a "silentbloc".

For such an intake manifold to exhibit, in response to the various running speeds of the engine, an acoustic law which is favorable to good filling of the engine, that is to say to the transfer to the engine of the column of air drawn in with minimum impedance, it is known practice for the manifold to be given a variable geometry, more particularly by varying the lengths of the air ducts, each of which extends between a means of controlling the flow rate of the air supplied to the engine, such as a throttle body, and the engine cylinder head, for supplying a cylinder of this engine with air.

To achieve this, it is known practice for each air duct to comprise two tubes in parallel, or for its upstream part to comprise two lengths of tube in parallel which meet, continuing with a single downstream length of tube, in series in the downstream direction with the two upstream lengths of tube, and for a restriction member or flap to be mounted to pivot in one or other of the two tubes or in one of the two upstream lengths of tube, and controlled in such a way as to close this upstream tube or upstream length of tube to a greater or lesser extent according to the engine running speed, so that a variation equivalent to a variation in length and/or diameter of the air duct is obtained.

However, these known arrangements have the drawback that depending on the engine running speeds, only one of the upstream tubes or lengths of tube or both tubes or lengths of tube simultaneously has or have the air passing through it or them, but not one or the other, which means that the acoustic response of the air duct is not perfectly suited to the needs, because of parasitic resonance.

In order to overcome the aforementioned drawback of such variable-geometry intake manifolds, and produce an intake manifold that can extend the engine charge range over which the acoustic impedance of the manifold is the most favorable, EP-A-355 960 discloses an intake manifold of the type presented hereinabove, and in which the downstream outlet of each upstream length of tube is placed in communication with the upstream inlet of the single downstream length of tube via an element mounted between the upstream part and downstream part of each air duct, and through which there passes an acoustic bore, said element being able to move between two extreme positions, in one of which said element closes said short upstream length of tube while its acoustic bore connects said long upstream length of tube to said downstream length of tube, whereas in the other extreme position, said element closes said long upstream length of tube while its acoustic bore connects said short upstream length of tube to said downstream length of tube.

This manifold thus makes it possible to place one or other of the two upstream lengths of tube in series with the single downstream length of tube, the long upstream length of tube allowing the longest possible air duct to be obtained, suitable for low engine speeds because it is tuned to the low resonant frequencies, while the short upstream length of tube, in series with the single downstream length of tube, makes it possible to obtain the shortest possible air duct suitable for when the engine is running at high speeds, because it is tuned to high resonant frequencies.

This intake manifold thus produces an acoustic response which is better suited to the engine speed.

However, the moving element in EP-A-355 960 is a cylindrical rotary valve which rotates on itself about its axis by about one third of a revolution in order to move from one of the extreme positions to the other, something which is a disadvantage in terms of controlling it, and demands products with close tolerances, which are therefore expensive, if problems of sealing between the air ducts are to be avoided.

The problem underlying the invention is that of providing an intake manifold of the type known from EP-A-355 960, but which is better suited than those described in that document to the various requirements of practice, and in particular as far as the compactness, the simplicity and the economy of manufacture of the control of the moving part, the amount by which it moves and the means for sealing it are concerned.

BRIEF SUMMARY OF THE INVENTION

In order to overcome these drawbacks, the manifold according to the invention is characterized in that the moving element is a retractable element, housed and mounted to pivot in a housing, and having, perpendicular to its axis of pivoting, two lateral faces each of which slides without rubbing contact, over a respective one of two lateral faces of the housing when said retractable element pivots in said housing, so as to produce a good lateral seal between the element and its housing by throttling.

Advantageously, the retractable element is produced in such a way that its acoustic bore is delimited between two shutters of said element, each of which closes a respective one of said short and long upstream lengths of tube in a respective one of said extreme positions.

The retractable element of each air duct is advantageously built into the rest of the structure of the intake manifold if, in addition, the housing in which the retractable element is housed and mounted to pivot, is integral with a manifold body delimiting a plenum chamber supplied with air by said means of controlling the air flow rate, and into which plenum each of said short and long upstream lengths of tube of each duct opens via its upstream inlet. This structure lends itself to the production as a single component, for example of synthetic material, of the manifold body with the short and long upstream lengths of tube and the housings each housing a retractable element and advantageously also having, on the outlet side of the acoustic bore of the corresponding retractable element, a tubular end piece intended to be connected in a sealed fashion to the corresponding downstream length of tube, it being possible for the component thus formed to have a flange for connecting the manifold to the air flow rate control means, such as a throttle body, this flange being pierced with an air inlet toward the plenum chamber. Incidentally, the downstream lengths of tube of the various air ducts may also be produced as a single piece with a flange for connection to the cylinder head, this piece having, more or less at the connection between each downstream length of tube and the flange, a housing for a corresponding fuel injector.

Thus, the intake manifold is produced by assembling, at the tubular outlet end pieces of the housings and the upstream inlets of the downstream lengths of tube, the aforementioned two components each of which is made as a single piece from elements which are molded, for example, of a synthetic material.

In order to improve the compactness of the manifold, it is also advantageous for each long upstream length of tube to extend at least partially inside said manifold body, along an internal face of this manifold body, around at least part of the periphery of the plenum chamber.

To make it easier for each retractable element to pivot between its extreme positions, it is advantageous for it to have a hub through which there passes an operating spindle by means of which this retractable element is pivoted.

Advantageously, all the retractable elements are driven simultaneously by a single operating spindle which has, for each retractable element, a centering, indexing and rotational-drive bearing surface which is housed in a bore of corresponding shape in the hub of the corresponding retractable element. For example, said bearing surfaces may have a transverse section in the shape of a square and be housed in bores of corresponding square section in the hubs of the retractable elements, it being possible for the bearing surfaces to be molded as a single piece with the operating spindle or attached, for example in the form of sleeves, and retained on a single cylindrical spindle by any known means, possibly with axial play with respect to this spindle, in order to favor rotation of the retractable elements in the housings.

For the rotational drive of the common operating spindle, one end of this spindle may project out of the manifold body and of the housings, and be acted upon either directly by an actuator, such as an electric motor, or by a linkage connecting it to an actuator, for example of pneumatic type with membrane.

Furthermore, to tune the acoustic response of the manifold to a particular engine speed, for example part way between the high and low speeds, each retractable element may advantageously be immobilized, by some of the aforementioned operating means, in an intermediate position part way between the two aforementioned extreme positions, so as partially and simultaneously to close the two upstream lengths of tube. This mode of operation of the manifold is made possible thanks to the progressive change that each retractable element allows between the long and short configurations of the corresponding air duct.

In addition, the acoustic bore of each retractable element advantageously has a transverse section that ensures continuity of section, in terms of shape and/or in terms of size, between said downstream length of tube, on the one hand, and, on the other hand, each of said upstream lengths of tube. Thus, the various lengths of tube may have the same shape of transverse section, but a section of progressively decreasing area, the transition in cross-sectional area occurring gradually in the acoustic bore of the retractable element. However, the acoustic bore may also have a changing shape of transverse section, so as gradually to change the shape of the section of the air duct between one or other upstream length of tube which has a transverse section of a first shape, and the single downstream length of tube which has a transverse section of a second shape.

In general, any adaptation in section between the upstream and downstream parts of each air duct may be provided in the transition region that the acoustic bore of the corresponding retractable element constitutes.

BRIEF DESCRIPTION OF THE SEVERAL VIEWS OF THE DRAWINGS

Other features and advantages of the invention will emerge from the description given hereinbelow by way of nonlimiting indication of one embodiment described with reference to the appended drawings, in which:

FIG. 1 depicts diagrammatically, partly in axial section and partly in side elevation, one example of an intake manifold with a pivoting retractable element between the upstream and downstream parts of each air duct, FIGS. 2 and 3 are part views of the manifold of FIG. 1, limited to one pivoting retractable element depicted respectively in each of its two extreme positions corresponding to the short and long configurations of an air duct, respectively, FIG. 4 is a section on IV—IV of FIG. 1, and FIG. 5 is a diagram of means of controlling the pivoting of the retractable elements of the manifold of FIGS. 1 to 4.

DETAILED DESCRIPTION OF THE INVENTION

The resonant intake manifold with variable and controlled geometry so that it exhibits improved acoustic properties, and of integral architecture, is depicted in its entirety in FIG. 1 as being attached to the cylinder head, diagrammatically depicted as 2 of a fuel-injected internal combustion engine of the four-stroke type with four in-line cylinders, the engine block of which is diagrammatically depicted as 1.

The intake manifold comprises four air ducts 3, arranged side by side so that each feeds a respective one of the four engine cylinders, and a single air duct is described hereinbelow with reference to FIGS. 1 to 4, because their structure is practically identical from one duct to the next.

Each air duct 3 comprises a downstream part consisting of a curved downstream tube 4, the concave side facing toward the engine block 1, and the downstream end of which is integral with a single flange 5 for attaching the manifold to the cylinder head 2 using screws or bolts (not depicted). In a position adjacent to the downstream end of the downstream tube 4, the flange 5 has a housing for a fuel injector 6 which may be of any known appropriate type. This injector housing 6 opens into a corresponding orifice in the flange 5, this orifice simultaneously constituting the downstream outlet of the downstream tube 4, and therefore of the air duct 3, for supplying one combustion chamber of the engine 1 with air and with fuel injected by the injector 6.

Each air duct 3 also comprises an upstream part 7 which itself comprises two upstream tubes 8 and 9 of different lengths, of which the tube 8 is short and the other tube 9 is long. These two upstream tubes 8 and 9 are produced in a manifold body 10 which is common to the upstream parts of the four air ducts 3, and which delimits an internal chamber or plenum chamber 11 and is closed by an upstream flange 12, on the external face of which a throttle body 13 is fixed, centered around an opening 14 made in the flange 12 to constitute an inlet via which the plenum 11 is supplied with air.

The short upstream tube 8 passes through the side wall of the body 10 which faces toward the corresponding downstream tube 4, while the long upstream tube 9 extends, over most of its length, inside the body 10, against the internal face of this body 10, the curvature of which it follows so that this long upstream tube 9 extends around part of the periphery of the plenum chamber 11. Each of the two upstream tubes 8 and 9 thus opens, via its upstream inlet, into the plenum chamber 11, and each of them also opens via its downstream outlet into a housing 15 integral with the body 10.

This housing 15 has approximately the shape of a portion of prism of transverse section (in the plane of FIG. 1) that is approximately triangular with a rounded vertex opposite a base which is not flat but curved, with the concave side facing toward the rounded vertex. Laterally, on the same side as the throttle body 13, the housing 15 has a tubular outlet end piece 16, which is slightly curved in the same direction as the downstream tube 4, and the downstream outlet end of which is connected in a sealed manner to the upstream inlet of the downstream tube 4 by a flexible sleeve 17 of known structure, in which the two opposing ends of the tubular end piece 16 and of the downstream tube 4 are push-fitted and retained, for example by elastic snap-fastening. In a known way, the flexible sleeve 17 provides a leaktight connection between the tubular outlet end piece 16 of the housing 15 and the downstream tube 4.

In each housing 15, a pivoting element 18, through which there passes a duct 19 known as the acoustic bore, is mounted to pivot about a geometric axis A perpendicular to the plane of FIG. 1.

In the pivoting element 18, the acoustic bore 19 is delimited between two shutters 20 and 21, both overhanging on the same side of a hub 22 via which the element 18, housed in the housing 15, is mounted to pivot. This hub 22 is accommodated in a lateral chamber delimited in the housing 15 by the rounded vertex thereof, and the side adjacent to it, on the opposite side to the tubular end piece 16. The element 18 can pivot in its housing 15 between two extreme positions, depicted in FIGS. 2 and 3, and in one of which (FIG. 2), the shutter 21 closes the extension, into the housing 15, of the long upstream tube 9, while the acoustic bore 19 extends the short upstream tube 8 and places the latter in communication with the tubular outlet end piece 16, and therefore with the downstream tube 4. This position corresponds to a short configuration of the air tube 3, the length of which may then be of the order of 300 to 400 mm, for example.

In the other extreme position (FIG. 3), the element 18 is pivoted so that its shutter 21 retracts approximately into the lateral chamber of the housing 15 and its solid shutter 20 completely closes the downstream outlet of the short upstream tube 8, while the acoustic bore 19 is in the extension of the long upstream tube 9 and places the latter in communication with the tubular end piece 16, and therefore with the downstream tube 4. This position corresponds to a long configuration of the air duct 3, in which the latter has a length which may be as much as 500 to 600 mm approximately.

Thus, by making the element 18 pivot from one of its two extreme positions to the other, the variation in length of the corresponding air duct 3 is controlled. Each pivoting element 18 together with its acoustic bore 19 and its two shutters 20 and 21 constitutes, with the corresponding housing 15, a variable-geometry system for the corresponding air duct 3. The short configuration of FIG. 2 is adopted at high engine speeds, whereas the long configuration of FIG. 3 is appropriate for low speeds.

The pivoting element 18 also plays the part of switchblades in the variable-geometry system for directing the air let into the plenum chamber 11, through the throttle body 13, as far as the downstream tube 4, passing either through the short upstream tube 8 and the acoustic bore 19, or through the long upstream tube 9 and the bore 19.

Thus, just one of the two upstream tubes 8 and 9 is active, and this eliminates parasitic resonance. The movement from one of the two configurations to the other is gradual and, if the controls for pivoting the element 18 allow it, it is also possible for this element to be kept in an intermediate position, in which the tab-shaped shutter 21 only partially closes the outlet of the long upstream tube 9, and in which at the same time the solid shutter 20 only partially closes the outlet of the short upstream tube 8, something which may be favorable to adjusting the acoustic impedance of the manifold for an engine speed that is part way between low speeds and high speeds.

By construction, the pivoting element 18 is mounted in its housing 15 with small lateral tolerances (see FIG. 4), so that the two lateral faces 18a of the element 18, which extend in two planes parallel to the plane of FIGS. 1 to 3, can slide over the lateral faces 15a of the housing 15 without rubbing contact, so that a small laminar leakage flow is obtained between each lateral face 18a of the element 18 and the lateral face 15a facing it of the housing 15, so as to produce a good lateral seal.

The shape and cross-sectional area of the acoustic bore 19 are chosen to be such as to ensure continuity of the cross section, constant in terms of shape and/or in terms of area, of the air duct 3, or alternatively so as to make the change in shape and/or area of this cross section occur gradually. For example, the cross section of the air duct 3 may be constant and equivalent to that of a circular section of a diameter of 50 to 25 mm approximately, or alternatively may decrease gradually from the upstream end, that is to say the outlet from the plenum chamber 11, as far as the downstream end, that is to say the inlet into the cylinder head 2, so that each air duct 3 converges slightly. However, the acoustic bore 19 may also allow the transition from a first shape of section, for example square or rectangular, in the upstream tubes 8 and 9, to a second shape of section, for example circular or oblong, in the downstream tube 4, and also in the tubular outlet end piece 16 of the housing 15.

In order to be rotated and pivoted from one of the two extreme positions to the other, the hub 22 of each pivoting element 18 has passing through it axially a bore of square cross section housing a driving surface of a square or flatted corresponding section, depicted at 23 in FIGS. 1 to 4, and retained on a operating spindle 24 common to all the elements 18 and which passes through all the surfaces 23 also centering and indexing the elements 18 in terms of angular position. These pivoting elements 18 are thus driven simultaneously by the single operating spindle 24 and its surfaces 23, which may be tubular surfaces secured around a operating spindle 24, or attached so that they slide with axial play on this operating spindle 24, to make the centering and pivoting of the pivoting elements 18 in the housings 15 easier, as described in document FR-A-2 724 418, for the simultaneous rotational drive of pivoting flaps in an intake manifold, and to which reference can be made for any details regarding the structure and the mounting of this simultaneous rotational drive mechanism.

Because of the position of the hub 22 downstream of the acoustic bore 19 and laterally offset outward with respect to the curvature of this bore 19 and to the plenum chamber 11, pivoting the element 18 through a small angular travel is enough to move this element 18 from one of these two extreme positions to the other, and this is something which is highly advantageous for controlling the pivoting and for lateral sealing between the lateral faces facing each other of the element 18 and of the housing 15.

As described also in the aforementioned document, one end of the operating spindle 24 for operating the pivoting elements 18 projects out of the manifold body 10 and of the housings 15, and this end may be driven in rotation about the geometric axis A by an operating actuator assembled on the side of the manifold body 10. This actuator may be an electric motor which directly rotates the operating spindle 24 or, as depicted diagrammatically in FIG. 5, a pneumatic actuator 25 with membrane 26 moving a control rod 27, also depicted in FIGS. 2 and 3, and of which the end outside the actuator 25 is articulated at 28 to one end of a connecting rod 29 secured, by its other end, to said end of the spindle 24 which is accessible outside of the manifold body 10. In FIGS. 2 and 3, the connecting rod 29 is depicted schematically in broken line extending along its longitudinal axis.

Where the spindle 24 passes through each lateral wall 15a of a housing 15, a good seal against the atmosphere is provided by a seal 24a mounted around the spindle 24, inside the housing 15, for example in a ring 15b between the lateral face 15a in question of this housing 15 and a corresponding thicker axial end 23a of the centering, indexing and drive surface 23 housed in the hub 22 of the corresponding pivoting element 18.

In FIG. 5, one of the chambers delimited in the actuator 25 by the membrane 26 and which houses a return spring 30, is connected by a duct 31 to one way of a three-way valve 32 with electric control and leakage flow rate controlled by a second way 33, and the third way of which is connected by a duct 34 to the intake manifold downstream of the throttle body 13 so as to be sensitive to the engine intake depression. Thus, when the engine is not running, the spring 30 returns the membrane 26 and the rod 27 to a position of rotating the connecting rod 29 and the corresponding spindle 24 into the short configuration of FIG. 2, depicted in broken line in FIG. 5. When the engine is started, as soon as there is a strong enough depression in the intake manifold, the membrane 26 shifts the rod 27 against the spring 30, which is compressed in the chamber of the actuator 25 which accommodates it and which communicates via the valve 32 with the duct 34 experiencing the engine intake depression. In this way, and at low engine speeds, the long configuration of FIG. 3 is obtained by rotating the connecting rod 29 and the spindle 24 into the position depicted in solid line in FIG. 5, the angle through which each element 18 pivots being represented diagrammatically by a double-headed arrow in this FIG. 5. When the engine is running at high speed, the depression in the intake manifold is no longer enough to keep the spring 30 compressed, and the latter returns the mechanism to the short configuration of FIG. 2.

The manifold described hereinabove may be made as two main parts of fiber-reinforced, for example glass-fiber-reinforced, synthetic material, the two parts being joined together at the flexible sleeves 17. One of these two parts is a downstream part, consisting of the four downstream tubes 4 and of the flange 5 for attaching to the cylinder head 2 of the engine 1, with the housings and seats for the injector 6. The other part is an upstream part consisting of the manifold body 10, the flange 12 for attachment and support of the throttle body 13, the short 8 and long 9 upstream tubes, and finally the housings 15, this upstream part also being made of a synthetic material, for example a fiber-reinforced moldable material. Finally, each pivoting element 18 is molded as a single part, preferably of synthetic material. All the parts of the manifold are dimensioned to avoid acoustic vibration, and have enough wall thickness, for example of the order of 3 mm, to avoid plastic deformation in service.

The attachment of the manifold to the engine block 1 may be supplemented by two vibration-damping mounts (not depicted) of the "silent bloc" type, mounted between the manifold body 10, as close as possible to the engine block 1, and the latter. This then yields an intake manifold which has a low level of acoustic emissions while at the same time avoiding an acoustic response which is well suited to the various engine running speeds.

What is claimed is:

1. Air intake manifold for a fuel-injected internal combustion engine, said engine of the type comprising a plurality of combustion chambers, and comprising for each combustion chamber, an air duct, a downstream part of which comprises a single length of tube connected to at least one flange for attaching to a cylinder head of the engine, and an upstream part of which comprises two lengths of tube, namely a short upstream length and a long upstream length, each of which is fed with air via an upstream inlet from means for controlling the flow rate of inlet air, optionally a throttle body, a downstream outlet of each length of upstream tube being intended to be placed in communication with the upstream inlet of the single length of downstream tube via an element mounted between the upstream part and downstream part of each air duct, and through which there passes an acoustic bore, said element being able to move between two extreme positions, in one of which said element closes said short upstream length of tube while its acoustic bore connects said long upstream length of tube to said downstream length of tube, whereas in the other extreme position, said element closes said long upstream-length of tube while its acoustic bore connects said short upstream length of tube to said downstream length of tube, wherein said element is a retractable element, housed and mounted to pivot in a housing, and includes, perpendicular to its axis (A) of pivoting, two lateral faces each of which slides without rubbing contact over a respective one of two lateral faces of the housing when said retractable element pivots in said housing, thereby producing a good lateral seal between the element and the housing;

wherein said retractable element comprises a hub pivotally attached to an operating spindle for pivoting the retractable element from one of the two extreme positions to the other; and wherein said operating spindle rotates about said pivot axis (A), said pivot axis being offset with respect to said acoustic bore.

2. Intake manifold according to claim 1, wherein on said retractable element, said acoustic bore is delimited between two shutters, each of which closes a respective one of the short and long upstream lengths of tube in a respective one of said extreme positions.

3. Intake manifold according to claim 1, wherein said housing is integral with a manifold body delimiting a plenum chamber supplied with air by said means of controlling the air flow rate, and into which plenum each of said short and long upstream lengths of tube of each air duct opens via its upstream inlet.

4. Intake manifold according to claim 3, wherein said long upstream length of tube extends at least partially into said manifold body along an internal face of this manifold body, around at least part of the periphery of the plenum chamber.

5. Intake manifold according to claim 1, wherein single operating spindle comprises each of said operating spindle for each of said retractable element for each of said combustion chambers, said single operating spindle simultaneously driving each of said retractable elements and including a centering, indexing and rotational-drive bearing surface which is housed in a bore of corresponding shape of the hub of the corresponding retractable element (18).

6. Intake manifold according to claim 5, wherein one end of the common operating spindle projects out of the manifold body and of the housings and is acted upon by one of an actuator, optionally an electric motor, and a linkage connecting it to an actuator, optionally a pneumatic actuator with membrane.

7. An intake manifold according to claim 1, wherein said retractable element is adapted to be immobilized in an intermediate position part way between said two extreme positions, in order to partially and simultaneously obstruct both upstream lengths of tube.

8. An intake manifold according to claim 1, wherein said acoustic bore of said retractable element comprises a transverse section that ensures continuity of section, in terms of at least one of shape and size, between said downstream length of tube and each of said upstream lengths of tube.

9. An intake manifold according to claim 1, wherein each housing of said each combustion chamber comprises, on the outlet side of the acoustic bore of the retractable element, a tubular end piece connected in a sealed fashion to the downstream length of tube.

10. An intake manifold according to claim 2, wherein said retractable element is adapted to be immobilized in an intermediate position part way between said two extreme positions, in order to partially and simultaneously obstruct both upstream lengths of tube.

11. An intake manifold according to claim 3, wherein said retractable element is adapted to be immobilized in an intermediate position part way between said two extreme positions, in order to partially and simultaneously obstruct both upstream lengths of tube.

12. An intake manifold according to claim 4, wherein said retractable element is adapted to be immobilized in an intermediate position part way between said two extreme positions, in order to partially and simultaneously obstruct both upstream lengths of tube.

13. An intake manifold according to claim 5, wherein said retractable element for each of said combustion chambers is adapted to be immobilized in an intermediate position part way between said two extreme positions, in order to partially and simultaneously obstruct both upstream lengths of tube.

14. An intake manifold according to claim 6, wherein said retractable element for each of said combustion chambers is adapted to be immobilized in an intermediate position part way between said two extreme positions, in order to partially and simultaneously obstruct both upstream lengths of tube.

15. An intake manifold according to claim 2, wherein said acoustic bore of said retractable element comprises a transverse section that ensures continuity of section, in terms of at least one member selected from the group consisting of shape and size, between said downstream length of tube, on the one hand, and, on the other hand, each of said upstream lengths of tube.

* * * * *